US012609080B2

(12) United States Patent

Iwauchi

(10) Patent No.: US 12,609,080 B2
(45) Date of Patent: Apr. 21, 2026

(54) DISPLAY DEVICE DRIVING METHOD AND DISPLAY DEVICE

(71) Applicant: Magnolia Blue Corporation, Tokyo (JP)

(72) Inventor: Eiji Iwauchi, Tokyo (JP)

(73) Assignee: Magnolia Blue Corporation, Tokyo (JP)

( * ) Notice: Subject to any disclaimer, the term of this patent is extended or adjusted under 35 U.S.C. 154(b) by 32 days.

(21) Appl. No.: 18/912,607

(22) Filed: Oct. 11, 2024

(65) Prior Publication Data

US 2025/0124869 A1 Apr. 17, 2025

(30) Foreign Application Priority Data

Oct. 13, 2023 (JP) ................................ 2023-177381

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2320/0233* (2013.01); *G09G 2320/0276* (2013.01); *G09G 2360/16* (2013.01)

(58) Field of Classification Search
None
See application file for complete search history.

(56) References Cited

U.S. PATENT DOCUMENTS 10,074,306 B2 9/2018 Kim et al.
2022/0036823 A1* 2/2022 Iwauchi .................. G09G 3/32
2022/0068204 A1* 3/2022 Iwauchi .............. G09G 3/3233
2022/0076626 A1* 3/2022 Iwauchi .............. G09G 3/3258
2024/0096279 A1* 3/2024 Lim .................... G09G 3/2007
2024/0331613 A1* 10/2024 Kim ........................ G09G 3/32

FOREIGN PATENT DOCUMENTS

JP 2016-109939 A 6/2016
JP 2022-026269 A 2/2022
JP 2022-042746 A 3/2022
JP 2022-045649 A 3/2022

* cited by examiner

*Primary Examiner* — Christopher J Kohlman
(74) *Attorney, Agent, or Firm* — XSENSUS LLP

(57) ABSTRACT

A display device driving method of driving a display device that includes a display panel including plural pixels, the display device driving method including: calculating, for each of the plural pixels, cumulative stress that is an accumulation of stress corresponding to an output luminance of the pixel; selecting, based on a selection signal input to the display device, one correlation data item from among a plurality of correlation data items each corresponding to a different one of the plural pixels and indicating a relationship between the cumulative stress and an efficiency residual ratio that indicates a degradation degree of the pixel; determining the efficiency residual ratio, based on the one correlation data item and the cumulative stress; and correcting, for each of the plural pixels, a luminance signal corresponding to the pixel, based on the efficiency residual ratio that corresponds to the pixel and is determined in the determining.

10 Claims, 12 Drawing Sheets

DISPLAY DEVICE DRIVING METHOD AND DISPLAY DEVICE

CROSS REFERENCE TO RELATED APPLICATION

The present application is based on and claims priority of Japanese Patent Application No. 2023-177381 filed on Oct. 13, 2023. The entire disclosure of the above-identified application, including the specification, drawings and claims is incorporated herein by reference in its entirety.

FIELD

The present disclosure relates to a display device driving method and a display device.

BACKGROUND

Display devices including organic EL (electroluminescent) elements in a matrix are adopted in display panels, and are commercialized. Similar to a screen of a color TV receiver, in a display (organic electroluminescent display) using organic EL elements, pixels of three primary colors, i.e., red (R), green (G), and blue (B), are arranged side by side, and are combined to emit light, so as to realize the display of detailed color images.

For self-luminous elements such as organic EL elements, it is generally known that a light-emitting layer constituting the organic EL elements is degraded according to the amount of emission and the emission time period. Degradation of the light-emitting layer mainly depends on the energized time period, the quantity of electricity energized, and the temperature during energization. The energized time period and the quantity of electricity energized generally vary for each emission color of a pixel. Therefore, in an organic EL display, the decreasing brightness trends due to degradation of the light-emitting layer is different for each color (R, G, B) of light emitted by the light-emitting layer, and there is a possibility that an image displayed on the organic EL display has misregistration.

In order to solve such a problem, a technology is disclosed that inhibits misregistration of images displayed on an organic EL display, maintains good white balance irrespective of degradation of organic EL elements, and improves the luminance of the entire display (for example, refer to Patent Literature (PTL) 1). The technology described in PTL 1 aims to correctly calculate the degradation degree of the organic EL elements by converting the time period during which a current is supplied to each organic EL element to a stress time at a reference current.

CITATION LIST

Patent Literature

PTL 1: Japanese Unexamined Patent Application Publication No. 2016-109939

SUMMARY

Technical Problem

However, in the technology disclosed in PTL 1, the stress property (that is, the life property) of each organic EL element may be different from the property used as a reference, due to individual differences in respective organic EL elements or the like. In such a case, since each organic EL element cannot emit light at desired luminance, display unevenness may occur in a display device.

The present disclosure provides a driving method of a display device and the like that can reduce display unevenness.

Solution to Problem

In order to achieve the above, a display device driving method according to an aspect of the present disclosure is a display device driving method of driving a display device that includes a display panel including a plurality of pixels, the display device driving method including: calculating, for each of the plurality of pixels, cumulative stress that is an accumulation of stress corresponding to an output luminance of the pixel; selecting, based on a selection signal input to the display device, one correlation data item from among a plurality of correlation data items each corresponding to a different one of the plurality of pixels and indicating a relationship between the cumulative stress and an efficiency residual ratio that indicates a degradation degree of the pixel; determining the efficiency residual ratio, based on the one correlation data item and the cumulative stress; and correcting, for each of the plurality of pixels, a luminance signal corresponding to the pixel, based on the efficiency residual ratio that corresponds to the pixel and is determined in the determining of the efficiency residual ratio.

In order to achieve the above, a display device driving method according to another aspect of the present disclosure is a display device driving method of driving a display device that includes a display panel including a plurality of pixels, the display device driving method including: calculating, for each of the plurality of pixels, cumulative stress that is an accumulation of stress corresponding to an output luminance of the pixel; determining, for each of the plurality of pixels, an efficiency residual ratio indicating a degradation degree of the pixel, based on the cumulative stress and correlation data that corresponds to the pixel and indicates a relationship between the cumulative stress and the efficiency residual ratio; generating, for each of the plurality of pixels, a first correction signal by correcting a luminance signal corresponding to the pixel, based on the efficiency residual ratio that corresponds to the pixel and is determined in the determining of the efficiency residual ratio; and generating a second correction signal by correcting the first correction signal, based on an additional gain signal input to the display device.

Furthermore, in order to achieve the above, a display device according to an aspect of the present disclosure is a display device that includes a display panel including a plurality of pixels, the display device including: a cumulative stress calculator that calculates, for each of the plurality of pixels, cumulative stress that is an accumulation of stress corresponding to an output luminance of the pixel; a selector that selects, based on a selection signal input to the display device, one correlation data item from among a plurality of correlation data items each corresponding to a different one of the plurality of pixels and indicating a relationship between the cumulative stress and an efficiency residual ratio that indicates a degradation degree of the pixel; an efficiency residual ratio determiner that determines the efficiency residual ratio, based on the one correlation data item and the cumulative stress; and a corrector that corrects, for each of the plurality of pixels, a luminance signal corresponding to the pixel, based on the efficiency residual ratio that corresponds to the pixel and is determined by the efficiency residual ratio determiner.

Furthermore, in order to achieve the above, a display device according to another aspect of the present disclosure is a display device that includes a display panel including a plurality of pixels, the display device including: a cumulative stress calculator that calculates, for each of the plurality of pixels, cumulative stress that is an accumulation of stress corresponding to an output luminance of the pixel; an efficiency residual ratio determiner that determines, for each of the plurality of pixels, an efficiency residual ratio indicating a degradation degree of the pixel, based on the cumulative stress and correlation data that corresponds to the pixel and indicates a relationship between the cumulative stress and the efficiency residual ratio; a first corrector that generates, for each of the plurality of pixels, a first correction signal by correcting a luminance signal corresponding to the pixel, based on the efficiency residual ratio that corresponds to the pixel and is determined by the efficiency residual ratio determiner; and a second corrector that generates a second correction signal by correcting the first correction signal, based on an additional gain signal input to the display device.

Note that these general or specific aspects may be implemented as a system, a method, an integrated circuit, a computer program, a computer-readable recording medium such as a compact disc read-only memory (CD-ROM), or as any combination of systems, methods, integrated circuits, computer programs, and recording media. The recording medium may be a non-transitory recording medium.

Advantageous Effects

According to the present disclosure, a driving method of a display device and the like that can reduce display unevenness can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
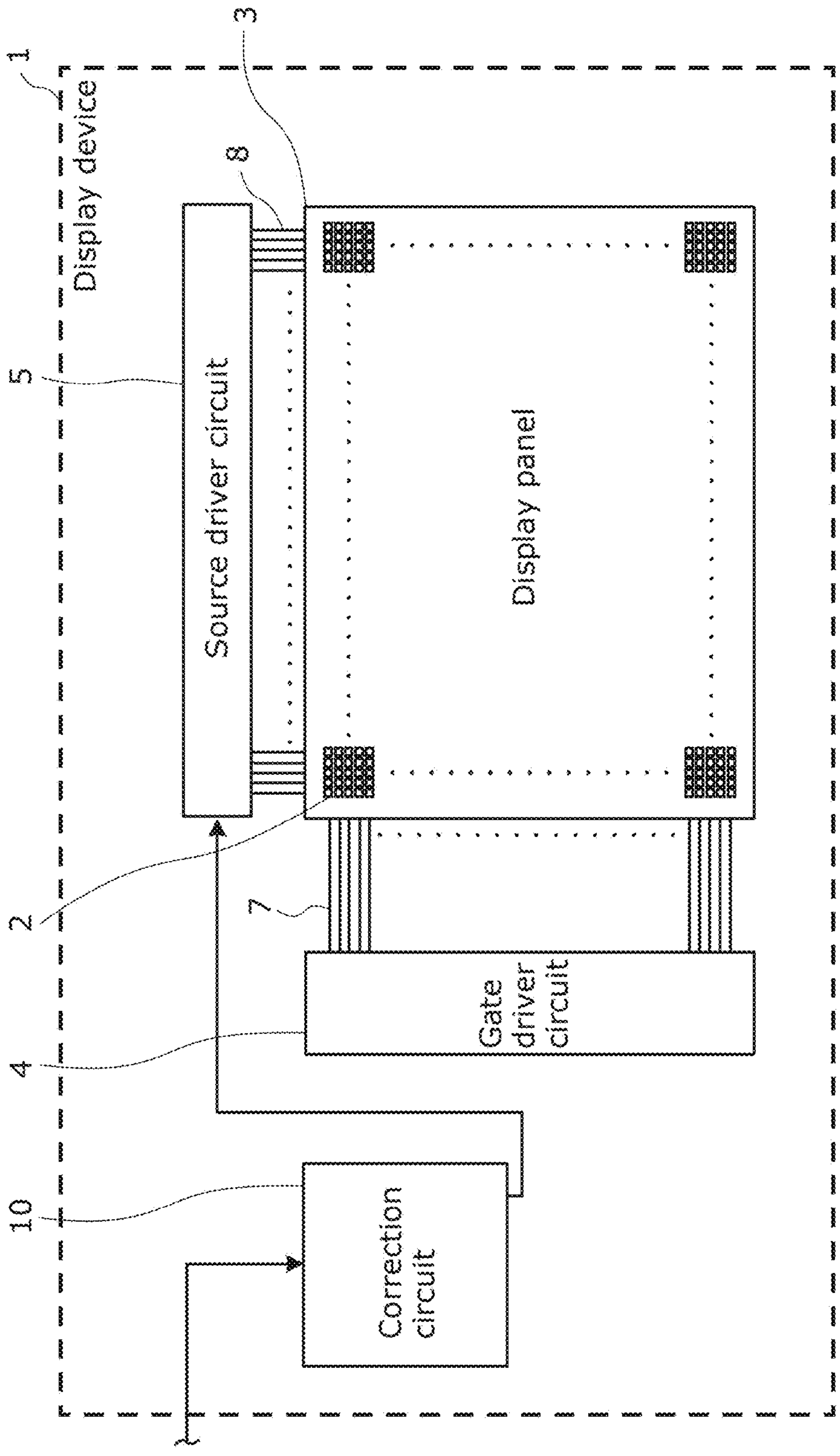
FIG. 1 is a schematic diagram illustrating the configuration of a display device according to Embodiment 1.

Hereinafter, embodiments of the present disclosure will be described with reference to the drawings. Note that each of the embodiments described below shows a specific example of the present disclosure. Therefore, the numerical values, shapes, materials, constituent elements, the arrangement and connection of the constituent elements, processes, and the order of the processes, etc., indicated in the embodiments described below are mere examples and do not intend to limit the present disclosure.

Note that the drawings are represented schematically and are not necessarily precise illustrations. In the drawings, essentially the same constituent elements share the same reference signs, and redundant descriptions will be omitted or simplified.

Embodiment 1

[1-1. Configuration of Display Device]

Figure 2:
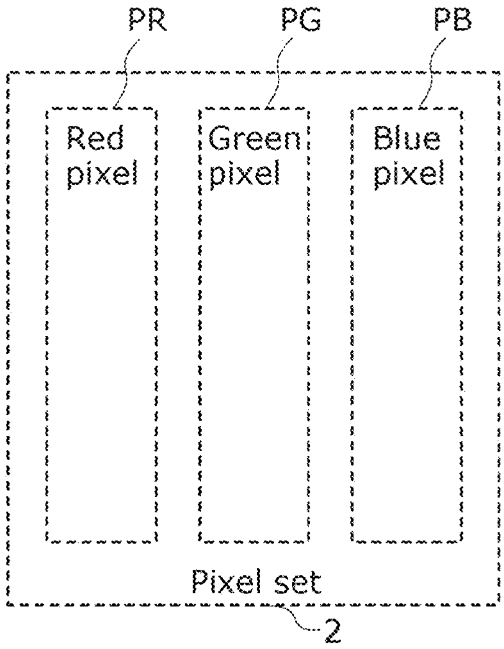
FIG. 2 is a diagram illustrating an example of the configuration of a pixel set according to Embodiment 1.
Figure 3:
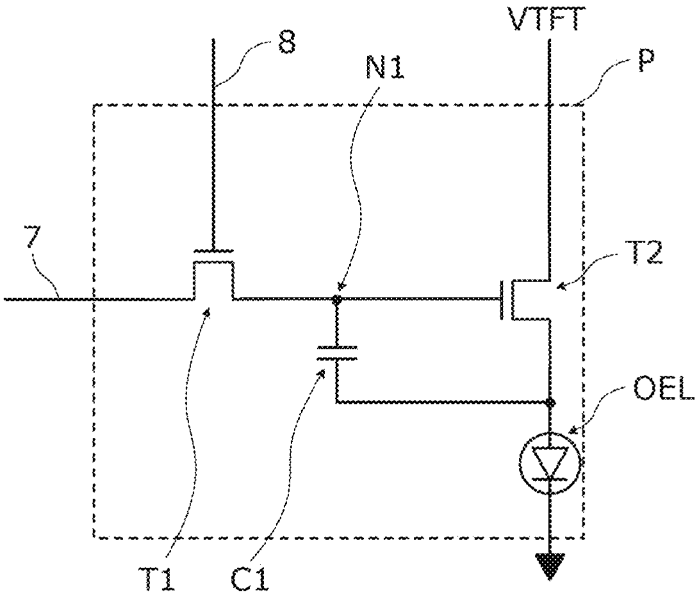
FIG. 3 is a circuit diagram illustrating an example of the configuration of a pixel according to Embodiment 1.
Figure 4:
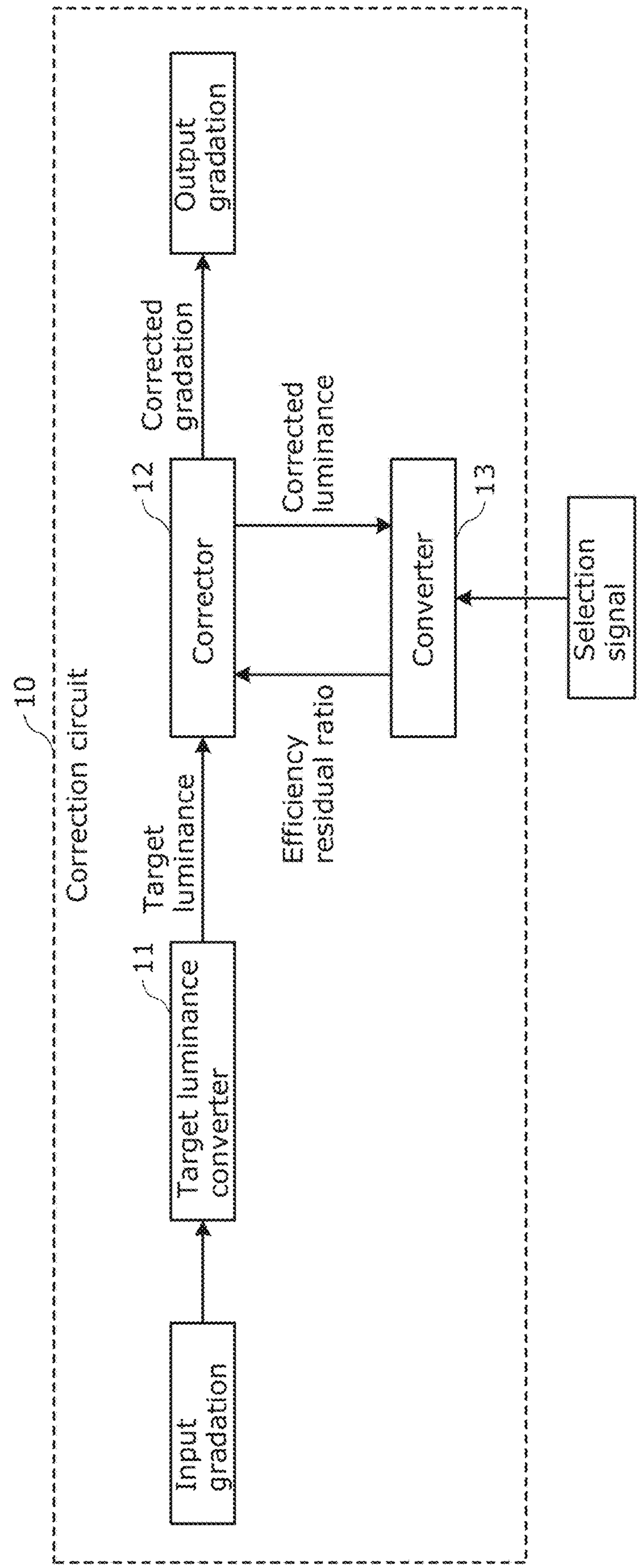
FIG. 4 is a block diagram illustrating the configuration of a correction circuit according to Embodiment 1.

The configuration of display device 1 according to Embodiment 1 will be described. FIG. 1 is a schematic diagram illustrating the configuration of display device 1 according to the present embodiment. FIG. 2 is a diagram illustrating an example of the configuration of pixel set 2 according to the present embodiment. FIG. 3 is a circuit diagram illustrating an example of the configuration of pixel P according to the present embodiment. FIG. 4 is a block diagram illustrating the configuration of correction circuit 10 according to the present embodiment.

As illustrated in FIG. 1, display device 1 includes display panel 3 in which a plurality of pixel sets 2 are arranged in a matrix, gate driver circuit 4, source driver circuit 5, and correction circuit 10.

Display panel 3 includes the plurality of pixel sets 2 arranged in a matrix. Each of a plurality of pixels P included in pixel set 2 is electrically connected to scanning line 7 and data line 8.

Pixel set 2 includes a plurality of pixels P. In the present embodiment, as illustrated in FIG. 2, pixel set 2 includes red pixel PR, green pixel PG, and blue pixel PB. Each of red pixel PR, green pixel PG, and blue pixel PB included in pixel set 2 is an example of pixel P according to the present embodiment. In other words, display panel 3 includes the plurality of pixels P, and the plurality of pixels P include pixels corresponding to a plurality of emission colors. For example, a plurality of red pixels PR, a plurality of green pixel PG, and a plurality of blue pixels PB are included in the plurality of pixels P.

In the present embodiment, each of the plurality of pixels P includes, as illustrated in FIG. 3, organic EL element OEL, selection transistor T1, drive transistor T2, and capacitance element C1.

Selection transistor T1 switches between selection and unselection of pixel P according to a drive signal that is output from a control circuit such as a timing controller (TCON). Selection transistor T1 is a thin film transistor (TFT), and a gate terminal is connected to scanning line 7, a source terminal is connected to data line 8, and a drain terminal is connected to node N1.

Drive transistor T2 supplies a drive current corresponding to the voltage value of data line 8 to organic EL element OEL. Drive transistor T2 is a thin film transistor, and a gate terminal is connected to node N1, a source terminal is connected to an anode electrode of organic EL element OEL, and voltage VTFT is supplied to a drain terminal from a power supply (not illustrated).

Organic EL element OEL is a light emitting element that emits light according to the drive current. The drive current is supplied from drive transistor T2. In organic EL element OEL, an anode electrode is connected to the source terminal of drive transistor T2, and a cathode electrode is grounded.

In capacitance element C1, one end is connected to node N1, and the other end is connected to the source terminal of drive transistor T2.

In pixel P, when scanning signal scan is supplied from scanning line 7, voltage Vdata according to a pixel signal is applied to a gate terminal of drive transistor T2 from data line 8. The pixel signal is adjusted as a gradation (luminance gradation) according to the emission luminance of organic EL element OEL. Organic EL element OEL emits light when the current according to a luminance gradation is applied. Therefore, the current according to the pixel signal (luminance gradation) flows to organic EL element OEL, and organic EL element OEL emits light at the emission luminance according to the pixel signal.

Note that the configuration of pixel P is not limited to the configuration illustrated in FIG. 3, and may have other configurations.

Scanning lines 7 are connected to gate driver circuit 4 illustrated in FIG. 1. Scanning signal scan is supplied to the gate terminal of selection transistor T1 included in pixel P from gate driver circuit 4 via scanning line 7.

Data lines 8 are connected to source driver circuit 5 illustrated in FIG. 1. Voltage Vdata according to the pixel signal is supplied to a drain terminal of selection transistor T1 included in pixel P from source driver circuit 5 via data line 8.

Correction circuit 10 illustrated in FIG. 1 and FIG. 4 is a circuit that performs correction of the luminance gradation (input gradation) supplied to pixel P, so that pixel P emits light at target luminance. The target luminance means the emission luminance corresponding to the input gradation in undegraded initial pixel P. Therefore, for degraded pixel P unable to achieve the target luminance corresponding to the input gradation, correction circuit 10 corrects the input gradation, and a current corresponding to the corrected input gradation is supplied to organic EL element OEL of pixel P. Accordingly, pixel P can achieve the target luminance.

As illustrated in FIG. 4, correction circuit 10 includes target luminance converter 11, corrector 12, and converter 13.

Target luminance converter 11 is a converter that converts an input gradation to a corresponding target luminance.

Corrector 12 is a processing unit that corrects a luminance signal corresponding to each of a plurality of pixels P based on an efficiency residual ratio. In the present embodiment, corrector 12 performs a calculation for correcting the input gradation to be supplied to organic EL element OEL, in order to achieve the target luminance corresponding to the luminance signal. That is, the luminance signal indicating the target luminance is input to corrector 12, and the corrected input gradation (corrected gradation) is output as an output gradation from corrector 12.

Converter 13 is a calculator that calculates a correction parameter to be used by corrector 12. In converter 13, efficiency residual ratio Rt is calculated as the correction parameter. In addition, in the present embodiment, a selection signal is input to converter 13. The selection signal is a signal that is input to display device 1.

Figure 5:
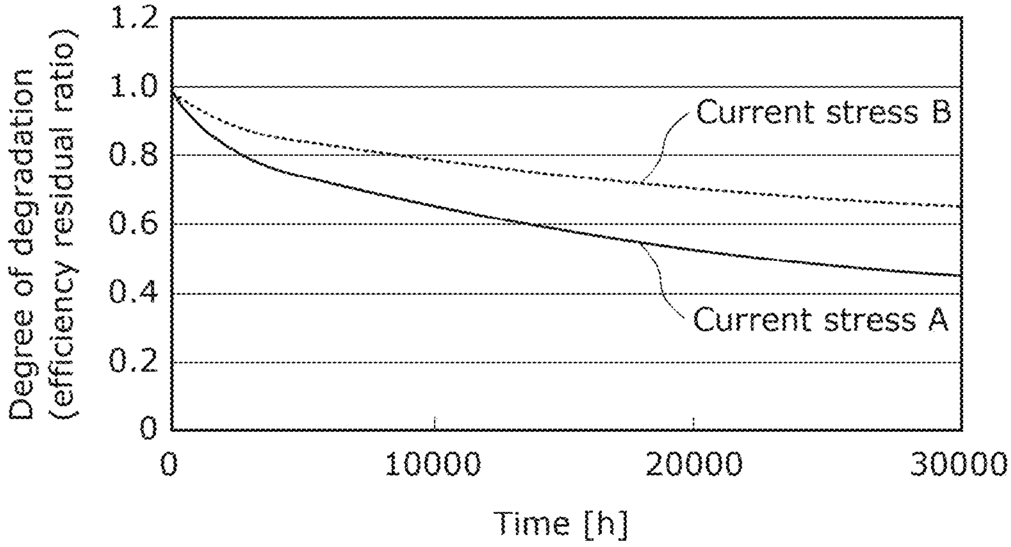
FIG. 5 is a diagram illustrating the relationship between the total time period for supplying a current to a pixel and the degradation degree (efficiency residual ratio) of the pixel according to Embodiment 1.

Hereinafter, the efficiency residual ratio will be described. FIG. 5 is a diagram illustrating the relationship between the total time period for supplying a current to pixel P and the degradation degree (efficiency residual ratio) of pixel P according to the present embodiment.

Organic EL element OEL included in pixel P emits light when the current according to the luminance gradation is applied as described above. The magnitude of current (current stress) supplied to organic EL element OEL varies depending on pixel signals. Therefore, the magnitude of current applied to organic EL element OEL depends on the pixel signal.

For example, as illustrated in FIG. 5, comparing a case where current stress A is applied to organic EL element OEL, and a case where current stress B smaller than current stress A is applied, the degradation of organic EL element OEL progresses more in the case where current stress A is applied than the case where current stress B is applied. In addition, since the time period during which a current is supplied to organic EL element OEL is also different for each organic EL element OEL, the longer the time period during which current stress is applied to organic EL element OEL, the more the degradation of organic EL element OEL progresses.

Therefore, since the degradation of organic EL element OEL depends on two parameters, i.e., the magnitude of current stress applied to organic EL element OEL and the time, it is difficult to simply represent the degradation degree. Therefore, the degradation degree of organic EL element OEL is converted to a time period during which a certain current (reference current) is supplied, and the converted time period is accumulated and represented as a cumulative stress time period by converter 13.

Furthermore, since the cumulative stress time period is 0 in initial organic EL element OEL, the emission luminance of initial organic EL element OEL is set to 1, and the rate of the emission luminance of degraded organic EL element OEL to the emission luminance of initial organic EL element OEL is calculated as efficiency remaining ratio Rt. That is, efficiency residual ratio Rt is the rate of the emission luminance of degraded organic EL element OEL with respect to the emission luminance of initial organic EL element OEL.

The cumulative stress time period is converted to efficiency residual ratio Rt of degraded organic EL element OEL.

With such a procedure, efficiency residual ratio Rt is calculated in converter 13. Furthermore, the emission luminance of degraded organic EL element OEL is indicated by multiplying efficiency residual ratio Rt with the emission luminance of initial organic EL element OEL.

Figure 6:
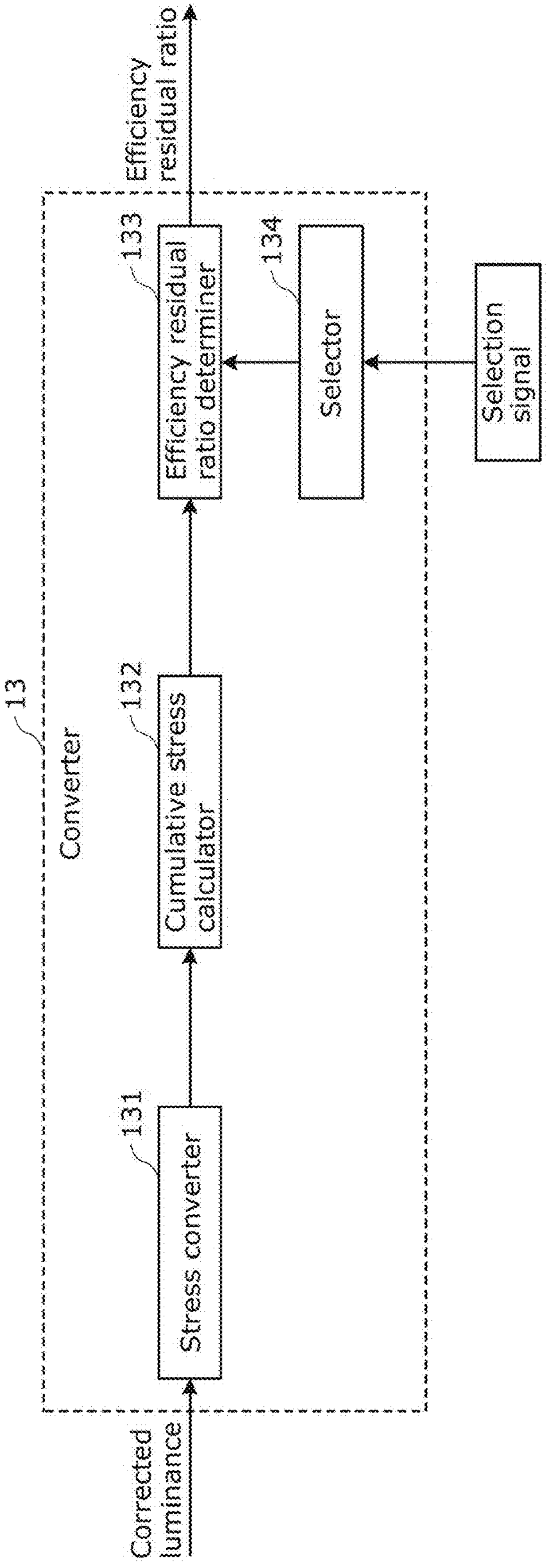
FIG. 6 is a block diagram illustrating the configuration of a converter according to Embodiment 1.

In the present embodiment, converter 13 changes the efficiency residual ratio to be output, according to the selection signal that is input. Hereinafter, the configuration of converter 13 according to the present embodiment will be described using FIG. 6. FIG. 6 is a block diagram illustrating the configuration of converter 13 according to the present embodiment. As illustrated in FIG. 6, converter 13 according to the present embodiment includes stress converter 131, cumulative stress calculator 132, efficiency residual ratio determiner 133, and selector 134.

Stress converter 131 is a processing unit that converts the corrected luminance that is output by corrector 12 into the stress of pixel P. That is, stress converter 131 calculates stress based on the output luminance of each of the plurality of pixels P, and outputs the stress to cumulative stress calculator 132. In the present embodiment, the degradation degree of pixel P in a case where the current corresponding to the corrected luminance is supplied to pixel P for a predetermined time period is converted, as the stress, into the time period (stress time) required to cause a degradation degree equivalent to that degradation degree in a case where the reference current is supplied to pixel P.

Cumulative stress calculator 132 is a processing unit that calculates, for each of the plurality of pixels P, cumulative stress that is an accumulation of stress corresponding to the output luminance of pixel P. In the present embodiment, the above-described stress time is accumulated from the time when driving of display device 1 is started.

Selector 134 is a processing unit that selects, based on a selection signal input to display device 1, one correlation data item from among a plurality of correlation data items each corresponding to a different one of the plurality of pixels P and indicating a relationship between the cumulative stress and an efficiency residual ratio that indicates a degradation degree of pixel P. This correlation data is determined in advance based on, for example, data obtained by actual measurement or the like using display panel 3 with the same specifications, and is stored in a storage device, such as a non-volatile memory, at the time of completion of the manufacturing process of display device 1. The correlation data may be, for example, a look-up table, or may be a correlation function or the like. The details of a plurality of correlation data items will be described later.

Efficiency residual ratio determiner 133 is a processing unit that determines the efficiency residual ratio, based on the one correlation data item selected by selector 134 and the cumulative stress. Efficiency residual ratio determiner 133 outputs the determined efficiency residual ratio to corrector 12.

In the present embodiment, by inputting the selection signal to display device 1, the correlation data can be selected based on the selection signal. Here, the selection signal can be determined based on the actual display state of display device 1. Therefore, even when the degradation property of each organic EL element OEL is different due to individual differences in organic EL elements OEL or the like, the correlation data tailored to the degradation property of each organic EL element OEL can be used. Accordingly, display unevenness due to individual differences in the degradation property of organic EL elements OEL or the like can be reliably reduced.

[1-2. Display Device Driving Method]

Figure 7:
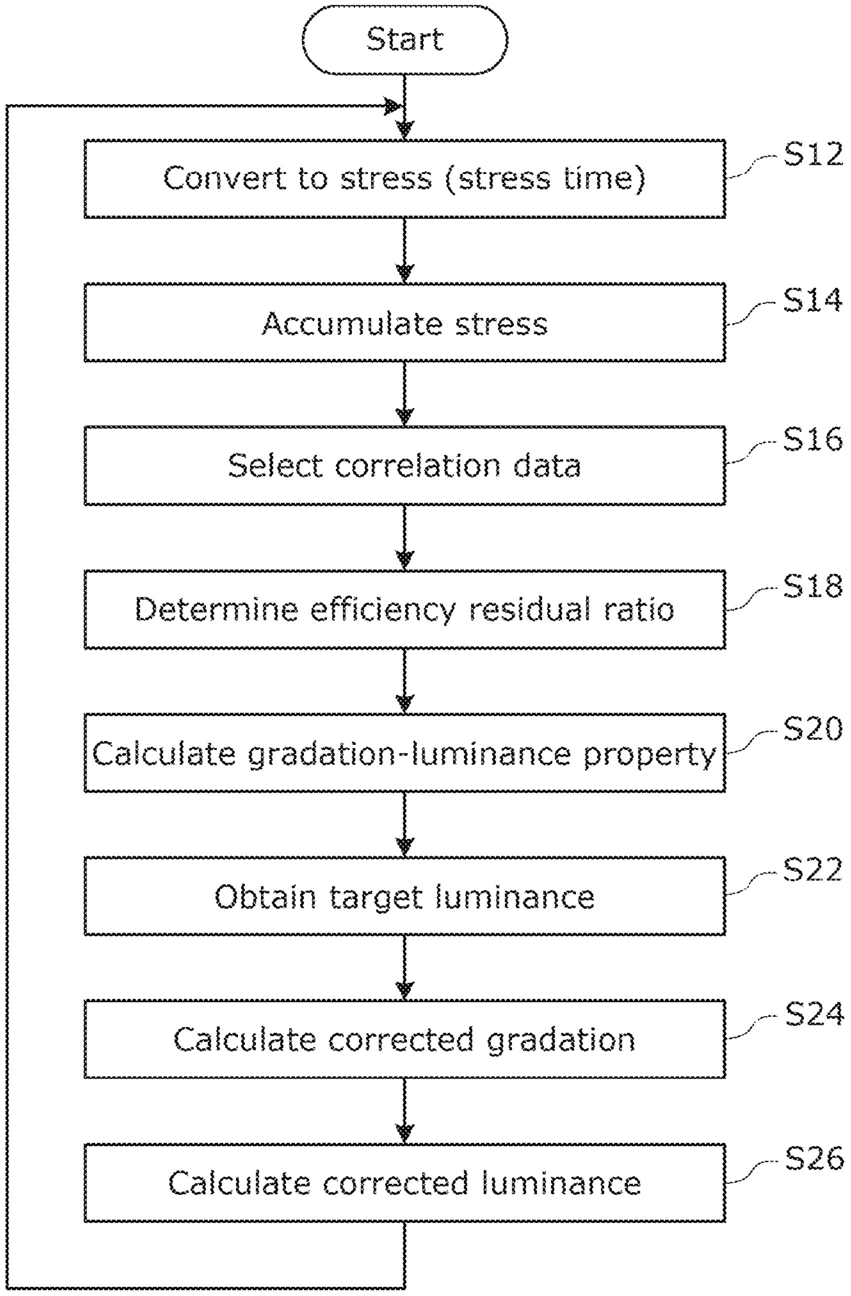
FIG. 7 is a flowchart illustrating a procedure of luminance correction according to Embodiment 1.

Next, a driving method of a display device will be described. FIG. 7 is a flowchart illustrating a procedure of luminance correction according to the present embodiment.

In the luminance correction of organic EL elements OEL, for the luminance difference and chromaticity shift between adjacent pixels at the time when the same gradation is displayed, which are caused by differences in the history of video signals, the efficiency residual ratio is calculated from an accumulation of the current stress due to the emission history of pixel, and required gradation is calculated from the efficiency residual ratio and the target luminance, so as to correct the output gradation.

Specifically, the luminance correction of organic EL elements OEL is performed by (1) a step of calculating efficiency residual ratio Rt, which is a correction parameter, and (2) a step of correcting an input gradation by using efficiency residual ratio Rt.

Figure 8:
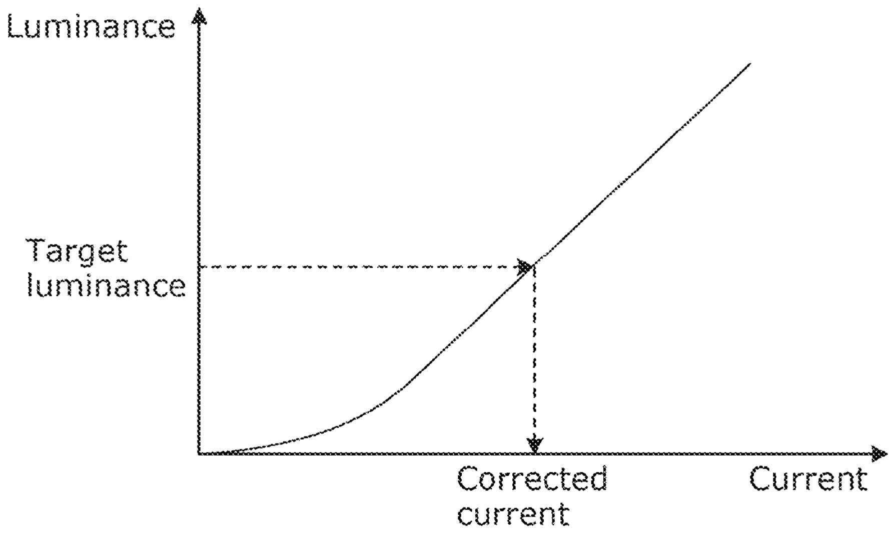
FIG. 8 is a diagram for converting a corrected luminance into a corrected current according to Embodiment 1.
Figure 9:
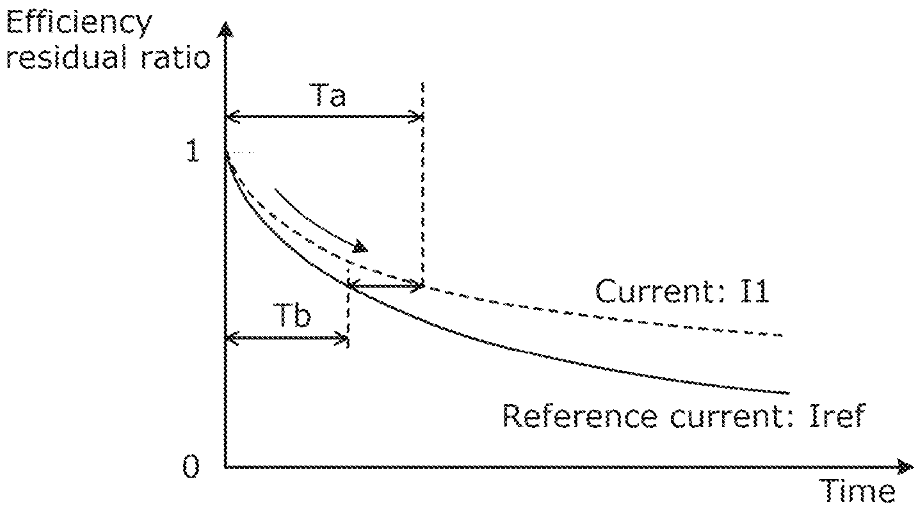
FIG. 9 is a diagram for obtaining a cumulative stress time period according to Embodiment 1.
Figure 10:
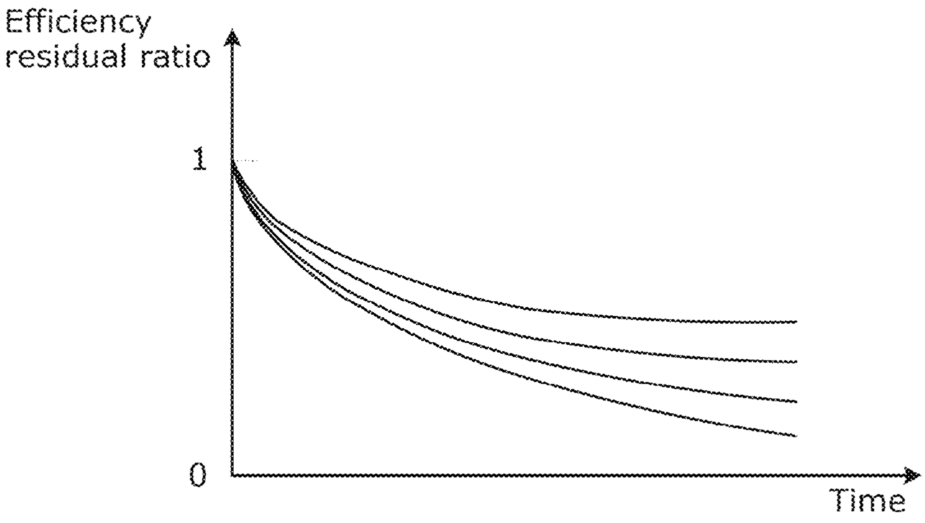
FIG. 10 is a graph illustrating an example of a plurality of correlation data items according to Embodiment 1.
Figure 11:
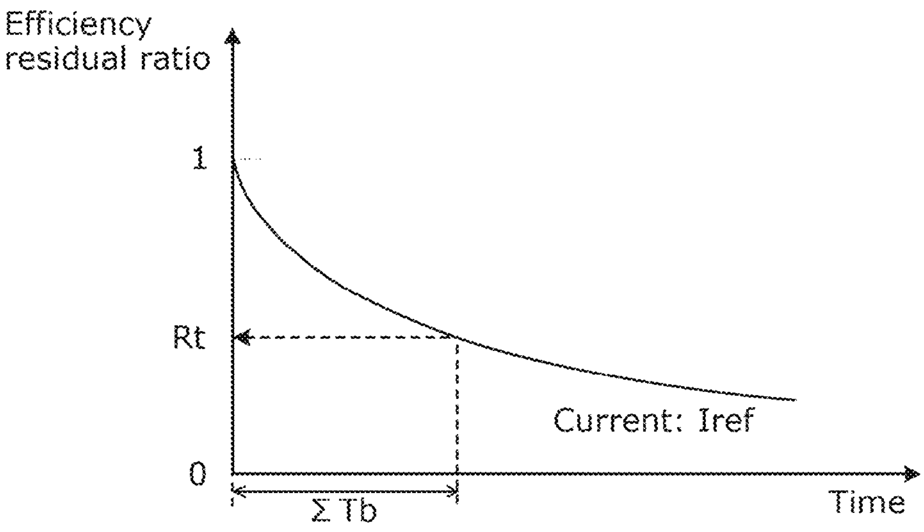
FIG. 11 is a diagram for obtaining an efficiency residual ratio according to Embodiment 1.

First, the step of calculating efficiency residual ratio Rt will be described. FIG. 8 is a diagram for converting a corrected luminance into a corrected current according to the present embodiment. FIG. 9 is a diagram for obtaining a cumulative stress time period according to the present embodiment. FIG. 10 is a graph illustrating an example of a plurality of correlation data items according to the present embodiment. FIG. 11 is a diagram for obtaining an efficiency residual ratio according to the present embodiment.

The step of calculating efficiency residual ratio Rt is mainly performed in converter 13. In converter 13, a cumulative stress time period is calculated by using a corrected luminance obtained from corrector 12, and efficiency residual ratio Rt is also calculated.

First, stress converter 131 of converter 13 converts the output luminance of each of the plurality of pixels P into stress (S12). In the present embodiment, the corrected luminance corresponding to the output luminance of each of the plurality of pixels P is converted into a stress time. Specifically, first, the corrected luminance is converted into a current (current stress). A curve illustrated in FIG. 8 is a curve illustrating the relationship between the current supplied to initial organic EL element OEL and the luminance. In this manner, the relationship between the luminance and the current is obtained in advance as the relationship between the current supplied to initial organic EL element OEL and the luminance. When the target luminance (here, the corrected luminance) is known, the magnitude of corresponding current is obtained from the curve illustrated in FIG. 8.

Next, the degradation degree of organic EL elements OEL in a case where when a current is supplied for a predetermined time period at the obtained magnitude of current is converted into a time period (stress time) in a case where the reference current is supplied. A curve illustrated in FIG. 9 is a diagram illustrating the relationship between the total time period during which a current is supplied to pixel P and the degradation degree (efficiency residual ratio) of pixel P, and illustrates a case where reference current Iref is supplied, and a case where current I1 is supplied. The efficiency residual ratio in the case where current I1 is supplied to organic EL elements OEL for time period Ta is converted into the efficiency residual ratio in the case where reference current Iref is supplied to organic EL elements OEL for stress time Tb. As described above, the corrected luminance is converted into the stress (stress time Tb).

Subsequently, cumulative stress calculator 132 of converter 13 calculates cumulative stress that is an accumulation of stress corresponding to the output luminance of each of the plurality of pixels P (S14). Specifically, converted stress time Tb is sequentially calculated each time a pixel signal is supplied, and converted stress time Tb is accumulated, so as to calculate cumulative stress time period $\Sigma$Tb as the cumulative stress. That is, the cumulative stress is a parameter indicating the degradation degree from initial organic EL elements OEL.

Subsequently, selector 134 of converter 13 selects one correlation data item from among a plurality of correlation data items indicating the relationship between the cumulative stress and the efficiency residual ratio, which indicates the degradation degree of each of the plurality of pixels P, based on the selection signal that is input to display device 1 (S16). Specifically, selector 134 selects, based on the selection signal, one correlation data item from the plurality of correlation data items indicating the correlation between the time period (cumulative stress time period) corresponding to the cumulative stress and the efficiency residual ratio as illustrated in FIG. 10. Note that, as each correlation data, selector 134 may have a plurality of look-up tables, or may have a plurality of correlation functions.

The selection signal is input by, for example, a user who is viewing and listening to display device 1, an engineer who performs adjustment of display device 1, or the like. When a partial region of display panel 3 emits light darker than the other area, the user inputs the selection signal for increasing the luminance of the partial region. Based on this selection signal, selector 134 selects correlation data having a degradation degree higher than usual as the correlation data of pixel P corresponding to the partial region. An input method of the selection signal and the like will be described later.

Subsequently, efficiency residual ratio determiner 133 of converter 13 determines the efficiency residual ratio based on the one correlation data item selected by selector 134 and the cumulative stress (S18). As illustrated in FIG. 11, cumulative stress time period ΣTb is converted into corresponding efficiency residual ratio Rt from the relationship between a supply time period and the efficiency residual ratio in a case where reference current Iref is supplied to organic EL element OEL. As will be described later, efficiency residual ratio Rt is output from converter 13 to corrector 12, and is used for the correction of the input gradation. In detail, the relationship (gradation-luminance property) between the emission luminance in degraded organic EL element OEL and the input gradation is calculated by multiplying the relationship (gradation-luminance property) between the emission luminance in initial organic EL element OEL and the input gradation by efficiency residual ratio Rt (S20).

Figure 12:
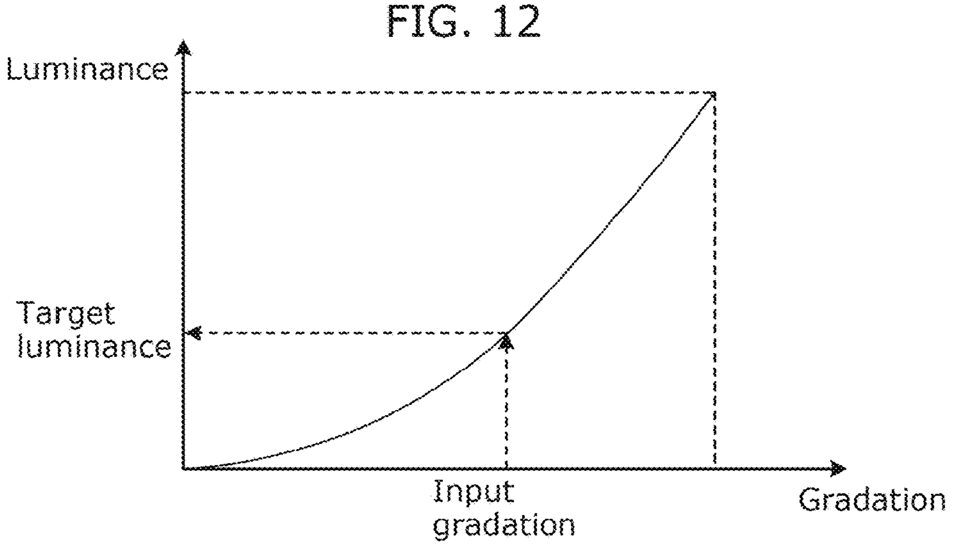
FIG. 12 is a diagram for converting an input gradation into a target luminance according to Embodiment 1.
Figure 13:
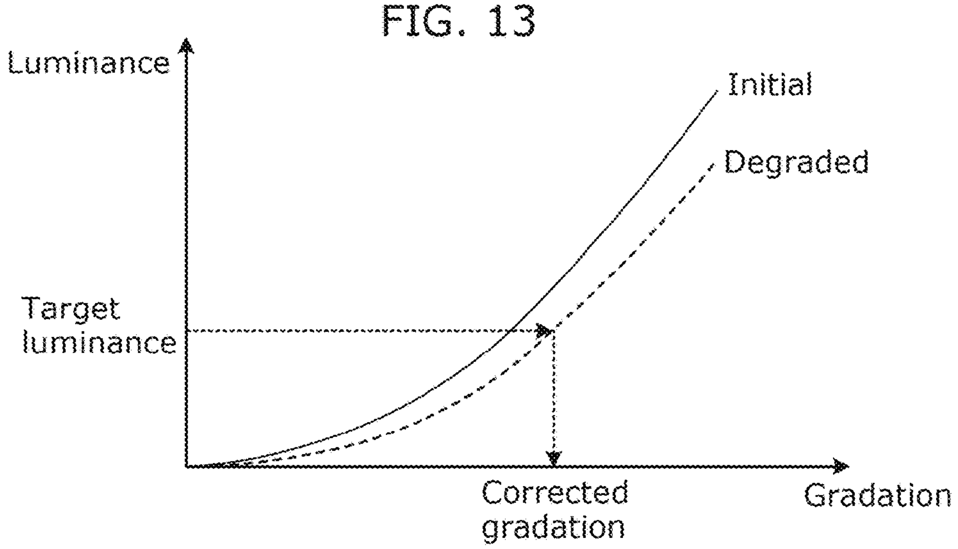
FIG. 13 is a diagram for obtaining a corrected gradation from the target luminance according to Embodiment 1.
Figure 14:
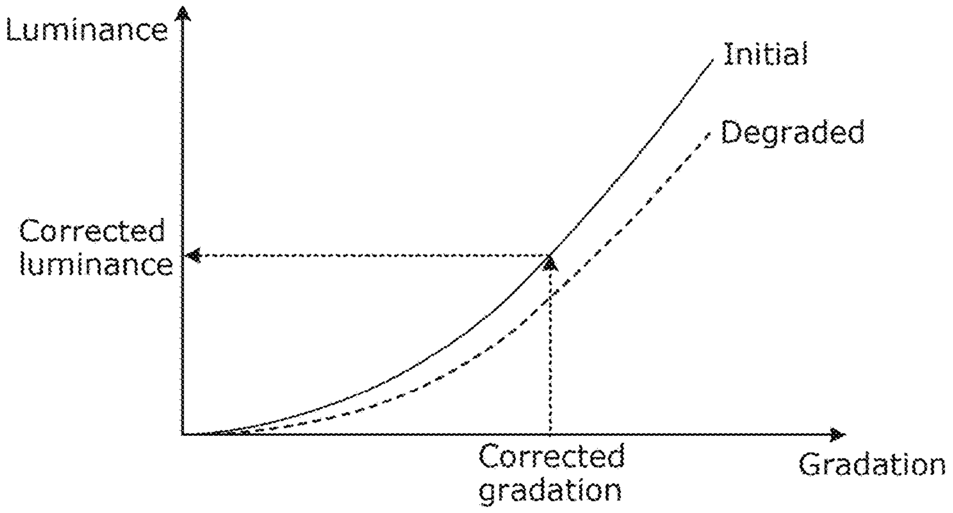
FIG. 14 is a diagram for obtaining the corrected luminance from the corrected gradation according to Embodiment 1.

Next, the step of correcting the input gradation by using efficiency residual ratio Rt will be described. FIG. 12 is a diagram for converting the input gradation into the target luminance according to the present embodiment. FIG. 13 is a diagram for obtaining the corrected gradation from the target luminance according to the present embodiment. FIG. 14 is a diagram for obtaining the corrected luminance from the corrected gradation according to the present embodiment.

The step of correcting the input gradation by using efficiency residual ratio Rt is mainly performed by target luminance converter 11 and corrector 12. In target luminance converter 11, an input gradation is converted into a target luminance, and in corrector 12, a corrected input gradation (corrected gradation) is output as an output gradation from the target luminance.

FIG. 12 illustrates the relationship between the input gradation and the target luminance in initial organic EL element OEL. From the relationship illustrated in FIG. 12, target luminance converter 11 obtains the target luminance corresponding to an input gradation from the input gradation (S22). Target luminance converter 11 outputs the obtained target luminance to corrector 12.

Subsequently, corrector 12 calculates a corrected gradation from the target luminance (S24). In FIG. 13, the relationship (gradation-luminance property) between the emission luminance and the input gradation in initial organic EL element OEL is illustrated by a solid line, and the relationship (gradation-luminance property) between the emission luminance and the input gradation in degraded organic EL element OEL calculated by multiplying the relationship (gradation-luminance property) between the emission luminance and the input gradation in initial organic EL element OEL by efficiency residual ratio Rt is illustrated by a broken line.

As illustrated in FIG. 13, the corrected input gradation in degraded organic EL element OEL is calculated from the above-described target luminance. The corrected gradation is output to source driver circuit 5 provided in the periphery of display panel 3, and a voltage is applied to a source terminal of selection transistor T1 of pixel P from source driver circuit 5, so that the current corresponding to the output gradation is supplied to organic EL element OEL.

In addition, as illustrated in FIG. 14, the corrected emission luminance (corrected luminance) is calculated from the relationship (gradation-luminance property) between the emission luminance and the input gradation in initial organic EL element OEL from the above-described corrected input gradation (S26). In other words, that is, based on the efficiency residual ratio determined in S18, the luminance signal corresponding to each of the plurality of pixels P is corrected.

Subsequently, the procedure returns to step S12, and the calculated corrected luminance is output from corrector 12 to converter 13, and is used for the step of calculating efficiency residual ratio Rt. After this, each of the above-described steps is repeated.

As mentioned above, in display device 1 according to the present embodiment, even when a different current is supplied to organic EL element OEL, the efficiency residual ratio in the reference current can be correctly calculated by converting the current into the stress time in the reference current.

In addition, since the corrected gradation is calculated from the efficiency residual ratio and the target luminance, correction to uniform luminance can be performed irrespective of the degradation degree (efficiency residual ratio) of each organic EL element OEL.

With the above-described two effects, a burn-in phenomenon in display panel 3 can be reduced in display device 1 according to the present embodiment.

Furthermore, in the present embodiment, by inputting the selection signal to display device 1, the correlation data can be selected based on the selection signal. Here, the selection signal can be determined based on the actual display state of display device 1. Therefore, even when the degradation property of each organic EL element OEL is different due to individual differences in organic EL elements OEL or the like, the correlation data tailored to the degradation property of each organic EL element OEL can be used. Accordingly, display unevenness due to individual differences in the degradation property of organic EL elements OEL or the like can be reliably reduced.

[1-3. Input Method of Selection Signal]

Figure 15:
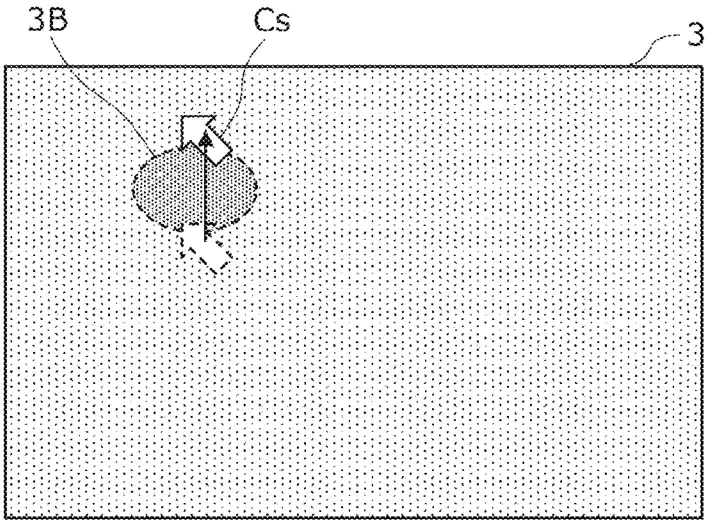
FIG. 15 is a diagram illustrating an example of an input method of a selection signal according to Embodiment 1.
Figure 16:
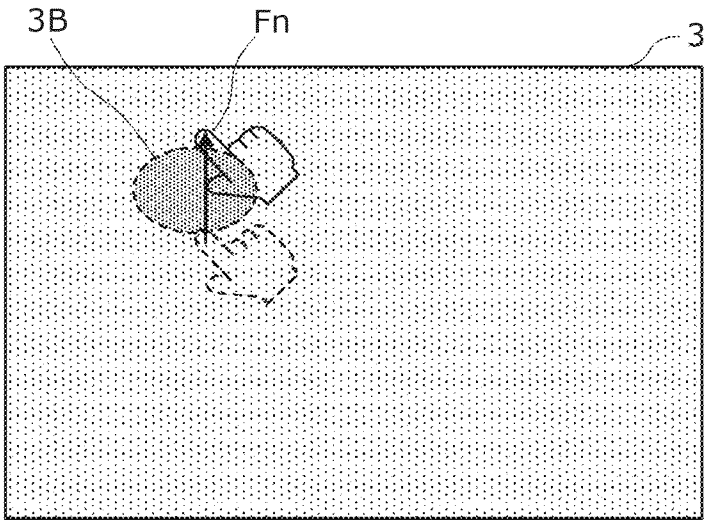
FIG. 16 is a diagram illustrating another example of the input method of the selection signal according to Embodiment 1.

An input method of a selection signal will be described by using FIG. 15 and FIG. 16. FIG. 15 is a diagram illustrating an example of the input method of the selection signal according to the present embodiment. FIG. 16 is a diagram illustrating another example of the input method of the selection signal according to the present embodiment.

A description will be given of an example of the input method of the selection signal in a case where display unevenness has occurred, since a part of display panel 3 has burn-in area 3B that emits light darker than the other area as illustrated in FIG. 15 and FIG. 16.

In the driving method of display device 1 according to the present embodiment, for each of the plurality of pixels P, a correspondence relationship between pixel P and the selection signal may be determined based on a position signal input to display device 1, and the selection signal may be determined based on a change in the position signal.

For example, the position signal may correspond to a position of a cursor displayed on display panel 3. In this case, as illustrated in FIG. 15, the selection signal for increasing the luminance of burn-in area 3B may be input by arranging cursor Cs on burn-in area 3B, and dragging cursor Cs upward. Here, the position of cursor Cs displayed on display panel 3 corresponds to a position signal.

In addition, when display panel 3 is a touch panel, the position signal may correspond to a touched position on display panel 3. In this case, as illustrated in FIG. 16, the selection signal for increasing the luminance of burn-in area 3B may be input by touching burn-in area 3B with finger Fn, and dragging finger Fn upward while touching burn-in area 3B. In addition, a touch pen or the like other than finger Fn may be used to touch display panel 3.

For example, the selection signal may be input for pixel P at the dragging starting position of cursor Cs or finger Fn, or display panel 3 may be divided into a plurality of blocks, and the selection signal may be input for a plurality of pixels P in the block corresponding to the dragging starting position of cursor Cs or finger Fn.

In addition, the selection signal may be changed according to the direction in which cursor Cs or finger Fn is dragged. For example, the selection signal for reducing the luminance may be input by dragging cursor Cs or finger Fn downward. Such a selection signal can be utilized in a case where, for example, display panel 3 has burn-in area 3B having luminance higher than the other area.

In addition, the amount by which the luminance is changed may be changed according to the number of times cursor Cs or finger Fn is dragged.

With the above-described input method, the selection signal can be easily and intuitively input by using cursor Cs, finger Fn, or the like.

Note that the input method of the selection signal is not limited to the above-described method. For example, the amount by which the luminance is changed may be input by the rotation amount of a mouse wheel. In addition, the information of coordinates or the like indicating a position signal, and the information of a numerical value corresponding to the amount by which the luminance is changed may be input to display device 1 from an input device such as a keyboard, or may be input to display device 1 via wired communication or wireless communication.

[1-4. Advantageous Effects etc.]

The driving method of display device 1 according to the present embodiment is a driving method of display device 1 that includes display panel 3 including a plurality of pixels P. The driving method of display device 1 includes: calculating, for each of the plurality of pixels P, cumulative stress that is an accumulation of stress corresponding to an output luminance of pixel P (S14); selecting, based on a selection signal input to display device 1, one correlation data item from among a plurality of correlation data items each corresponding to a different one of the plurality of pixels P and indicating a relationship between the cumulative stress and an efficiency residual ratio that indicates a degradation degree of pixel P (S16); determining the efficiency residual ratio, based on the one correlation data item and the cumulative stress (S18); and correcting, for each of the plurality of pixels P, a luminance signal corresponding to pixel P, based on the efficiency residual ratio that corresponds to pixel P and is determined in the determining of the efficiency residual ratio (S26).

In this manner, by inputting the selection signal according to the display state of display device 1 to display device 1, the correlation data can be selected based on the selection signal. Here, the selection signal can be determined based on the actual display state of display device 1. Therefore, even when the degradation property of each organic EL element OEL is different due to individual differences in organic EL elements OEL or the like, the correlation data tailored to the degradation property of each organic EL element OEL can be used. Accordingly, display unevenness due to individual differences in the degradation property of organic EL elements OEL or the like can be reliably reduced.

In addition, for each of the plurality of pixels P, a correspondence relationship between pixel P and the selection signal may be determined based on a position signal input to display device 1, and the selection signal may be determined based on a change in the position signal.

Accordingly, the selection signal can be easily and intuitively input by using the cursor or the like.

In addition, the position signal may correspond to a position of a cursor displayed on display panel 3.

Accordingly, the selection signal can be easily input by using the cursor.

In addition, display panel 3 may be a touch panel, and the position signal may correspond to a touched position on display panel 3.

Accordingly, the selection signal can be easily input by touching display panel 3 with a finger or the like.

Display device 1 according to the present embodiment includes display panel 3 including a plurality of pixels P. Display device 1 includes: cumulative stress calculator 132 that calculates, for each of the plurality of pixels P, cumulative stress that is an accumulation of stress corresponding to an output luminance of pixel P; selector 134 that selects, based on a selection signal input to display device 1, one correlation data item from among a plurality of correlation data items each corresponding to a different one of the plurality of pixels P and indicating a relationship between the cumulative stress and an efficiency residual ratio that indicates a degradation degree of pixel P; efficiency residual ratio determiner 133 that determines the efficiency residual ratio, based on the one correlation data item and the cumulative stress; and corrector 12 that corrects, for each of the plurality of pixels P, a luminance signal corresponding to pixel P, based on the efficiency residual ratio that corresponds to pixel P and is determined by efficiency residual ratio determiner 133.

Accordingly, the same effects as those of the above-described driving method of a display device can be achieved.

Embodiment 2

A driving method of a display device and a display device according to Embodiment 2 will be described. The driving method of a display device according to the present embodiment is different from the driving method of display device 1 according to Embodiment 1 in the correction method of the luminance signal corresponding to each of the plurality of pixels P. Hereinafter, a description will be given of the driving method of the display device and the like according to the present embodiment, focusing on the differences from the driving method of display device 1 according to Embodiment 1.

[2-1. Configuration of Display Device]

Figure 17:
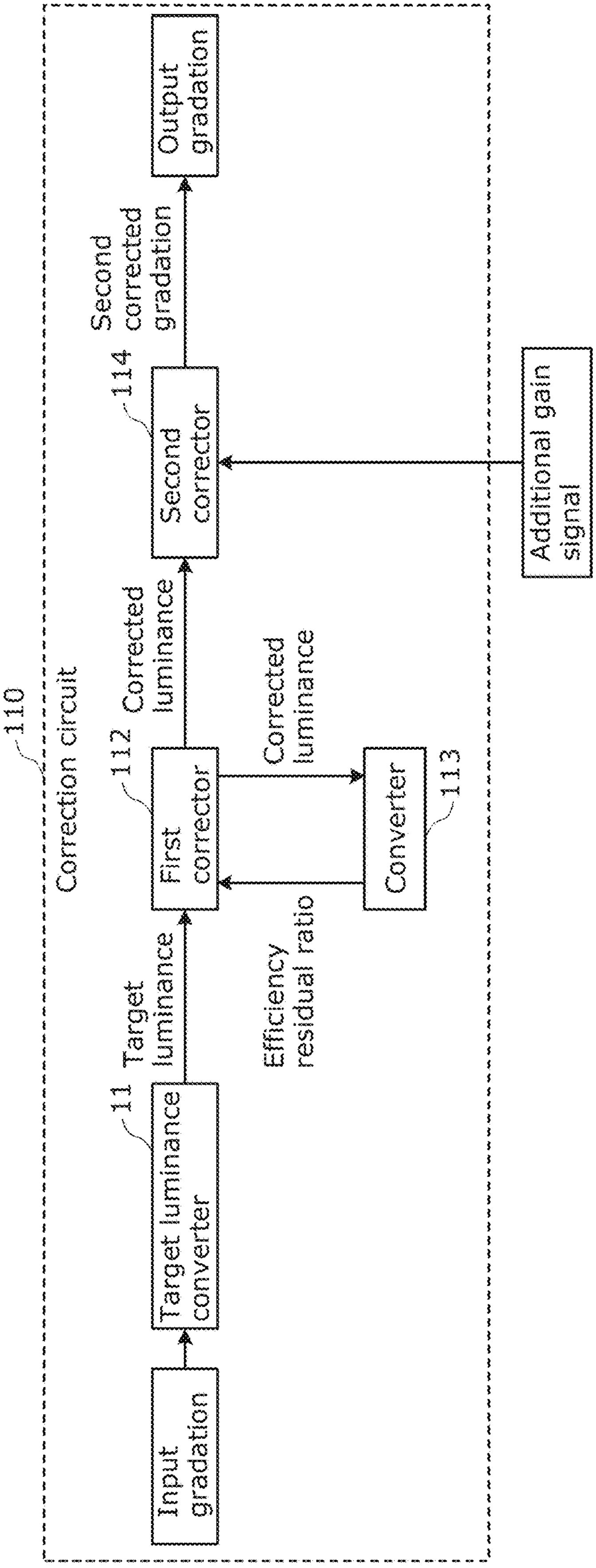
FIG. 17 is a block diagram illustrating the configuration of the correction circuit according to Embodiment 1.

A display device according to the present embodiment is different from display device 1 according to Embodiment 1 in the configuration of a correction circuit. Hereinafter, the correction circuit of the display device according to the present embodiment will be described by using FIG. 17. FIG. 17 is a block diagram illustrating the configuration of correction circuit 110 according to the present embodiment.

As illustrated in FIG. 17, correction circuit 110 according to the present embodiment includes target luminance converter 11, first corrector 112, converter 113, and second corrector 114.

Converter 113 according to the present embodiment is different from converter 13 according to Embodiment 1 in that selector 134 is not included, and is the same in other respects. That is, converter 113 includes stress converter 131, cumulative stress calculator 132, and efficiency residual ratio determiner 133 that are illustrated in FIG. 6. In the present embodiment, efficiency residual ratio determiner 133 determines the efficiency residual ratio based on a single correlation data item indicating the relationship between the cumulative stress and the efficiency residual ratio, which indicates the degradation degree of each of the plurality of pixels P, and the cumulative stress.

First corrector 112 according to the present embodiment is different from corrector 12 according to Embodiment 1 in a signal to be output, and is the same in other respects. First corrector 112 generates, for each of the plurality of pixels P, a first correction signal by correcting a luminance signal corresponding to pixel P, based on the efficiency residual ratio that corresponds to pixel P and is determined by efficiency residual ratio determiner 133. First corrector 112 outputs corrected luminance, which is an example of a first correction signal, to converter 113 and second corrector 114.

Second corrector 114 according to the present embodiment generates a second correction signal by correcting the first correction signal, based on an additional gain signal input to the display device. An additional gain signal is a signal for correcting the luminance of each of the plurality of pixels P, and indicates, for example, a numerical value larger than 0. The additional gain signal may indicate, for example, a value of ten or less. Although the correction method in second corrector 114 is not particularly limited, second corrected luminance may be generated as an example of a second correction signal by, for example, multiplying the corrected luminance, which is an example of the first correction signal, by the additional gain signal. Accordingly, the luminance of pixel P can be increased by inputting, to a display device, a signal indicating a numerical value larger than 1 as the additional gain signal, and the luminance of pixel P can be reduced by inputting, to the display device, a signal indicating a numerical value less than one as the additional gain signal.

In the present embodiment, second corrector 114 calculates a second corrected gradation, which is the gradation signal corresponding to the second corrected luminance. The second corrected gradation is calculated with the same method as the calculation of the corrected gradation by corrector 12 according to Embodiment 1.

In the display device according to the present embodiment, the luminance of each pixel P can be appropriately corrected by inputting the additional gain signal. Here, the additional gain signal can be determined based on the actual display state of the display device. Therefore, even when the degradation property of each organic EL element OEL is different due to individual differences in organic EL elements OEL or the like, the luminance of each pixel can be corrected according to the degradation property of each organic EL element OEL. Accordingly, display unevenness due to individual differences in the degradation property of organic EL elements OEL or the like can be reliably reduced.

[2-2. Display Device Driving Method]

Figure 18:
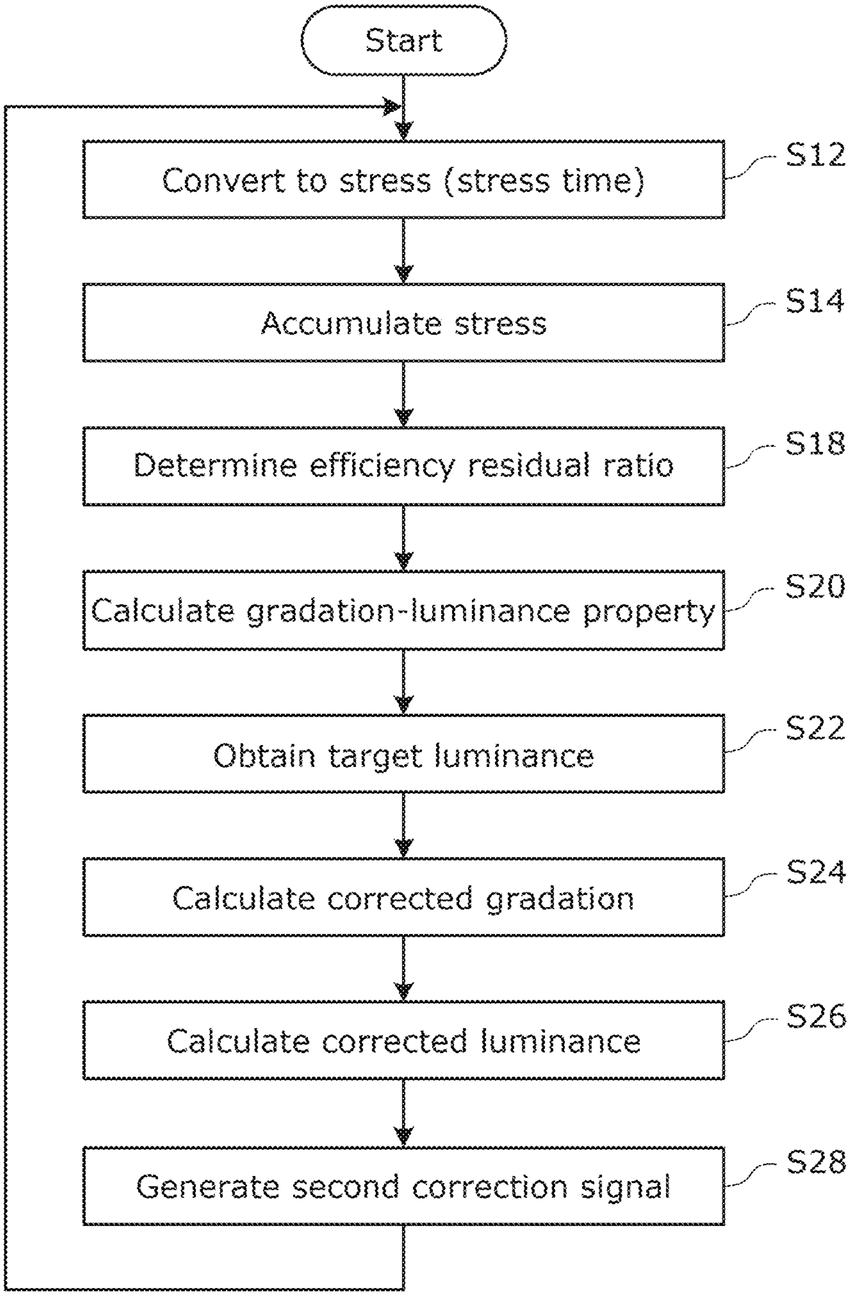
FIG. 18 is a flowchart illustrating a procedure of luminance correction according to Embodiment 1.

A driving method of a display device according to the present embodiment will be described by using FIG. 18. FIG. 18 is a flowchart illustrating a procedure of luminance correction according to the present embodiment.

As illustrated in FIG. 18, step S12 and step S14 are performed in a manner similar to Embodiment 1.

Subsequently, efficiency residual ratio determiner 133 of converter 13 according to the present embodiment determines, for each of the plurality of pixels, an efficiency residual ratio indicating a degradation degree of pixel P, based on the cumulative stress and correlation data that corresponds to pixel P and indicates a relationship between the cumulative stress and the efficiency residual ratio (S18).

Subsequently, step S20 to step S26 are performed in a manner similar to Embodiment 1.

Subsequently, second corrector 114 generates a second correction signal by correcting the corrected luminance, which is an example of the first correction signal, based on the additional gain signal that is input to the display device (S28). In the present embodiment, second corrector 114 calculates the second corrected gradation, which is the gradation signal corresponding to the second corrected luminance, and outputs the second corrected gradation to display panel 3. The second corrected gradation is calculated with the same method as the calculation of the corrected gradation by corrector 12 according to Embodiment 1.

Subsequently, the procedure returns to step S12, and the calculated corrected luminance is output from corrector 12 to converter 13, and is used for the step of calculating efficiency residual ratio Rt. After this, each of the above-described steps is repeated. Note that, instead of the corrected luminance, the second corrected luminance may be input to converter 113 from second corrector 114, and the second corrected luminance may be used for the step of calculating efficiency residual ratio Rt.

In the present embodiment, by inputting the additional gain signal to the display device, the luminance of each pixel P can be corrected based on the additional gain signal. Here, the additional gain signal can be determined based on the actual display state of the display device. Therefore, even when the degradation property of each organic EL element OEL is different due to individual differences in organic EL elements OEL or the like, the luminance of each pixel can be corrected according to the degradation property of each organic EL element OEL. Accordingly, display unevenness due to individual differences in the degradation property of organic EL elements OEL or the like can be reliably reduced.

[2-3. Input Method of Additional Gain Signal]

An input method of an additional gain signal according to the present embodiment will be described. In the present embodiment, for each of the plurality of pixels P, a correspondence relationship between pixel P and the additional gain signal may be determined based on a position signal input to the display device, and the additional gain signal may be determined based on a change in the position signal.

For example, as in the configuration described by using FIG. 15 in Embodiment 1, a position signal may correspond to the position of cursor Cs displayed on display panel 3. In this case, the additional gain signal may be determined based on the movement of the position of cursor Cs. For example, the value indicated by the additional gain signal may be increased as the number of times of dragging cursor Cs upward is increased, and the value indicated by the additional gain signal may be decreased as the number of times of dragging cursor Cs downward is increased. Alternatively, the magnitude of the additional gain signal may be determined according to the length cursor Cs is dragged.

In addition, as in the configuration described by using FIG. 16 in Embodiment 1, display panel 3 is a touch panel, and the position signal may correspond to the position at which display panel 3 is touched. In this case, the additional gain signal may be determined based on the movement of the position of finger Fn or the like touching display panel 3. For example, the value indicated by the additional gain signal may be increased as the number of times of dragging finger Fn upward is increased, and the value indicated by the additional gain signal may be decreased as the number of times of dragging finger Fn downward is increased. Alternatively, the magnitude of the additional gain signal may be determined according to the length finger Fn is dragged.

With the above-described input method, the selection signal can be easily and intuitively input by using cursor Cs, finger Fn, or the like.

[2-4. Advantageous Effects Etc.]

The driving method of a display device according to the present embodiment is a driving method of a display device that includes display panel 3 including a plurality of pixels P. The driving method of a display device includes: calculating, for each of the plurality of pixels P, cumulative stress that is an accumulation of stress corresponding to an output luminance of pixel P (S14); determining, for each of the plurality of pixels P, an efficiency residual ratio indicating a degradation degree of pixel P, based on the cumulative stress and correlation data that corresponds to pixel P and indicates a relationship between the cumulative stress and the efficiency residual ratio (S18); generating, for each of the plurality of pixels P, a first correction signal by correcting a luminance signal corresponding to pixel P, based on the efficiency residual ratio that corresponds to pixel P and is determined in the determining of the efficiency residual ratio (S26); and generating a second correction signal by correcting the first correction signal, based on an additional gain signal input to the display device (S28).

In this manner, by inputting the additional gain signal to the display device, the luminance of each pixel P can be corrected based on the additional gain signal. Here, the additional gain signal can be determined based on the actual display state of the display device. Therefore, even when the degradation property of each organic EL element OEL is different due to individual differences in organic EL elements OEL or the like, the luminance of each pixel can be corrected according to the degradation property of each organic EL element OEL. Accordingly, display unevenness due to individual differences in the degradation property of organic EL elements OEL or the like can be reliably reduced.

In addition, for each of the plurality of pixels P, a correspondence relationship between pixel P and the additional gain signal may be determined based on a position signal input to the display device, and the additional gain signal may be determined based on a change in the position signal.

Accordingly, the selection signal can be easily and intuitively input by using the cursor or the like.

In addition, the position signal may correspond to a position of a cursor displayed on display panel 3.

Accordingly, the selection signal can be easily input by using the cursor.

In addition, display panel 3 may be a touch panel, and the position signal may correspond to a touched position on display panel 3.

Accordingly, the selection signal can be easily input by touching display panel 3 with a finger or the like.

The display device according to the present embodiment includes a display panel including a plurality of pixels P. The display device includes: cumulative stress calculator 132 that calculates, for each of the plurality of pixels P, cumulative stress that is an accumulation of stress corresponding to an output luminance of pixel P; efficiency residual ratio determiner 133 that determines, for each of the plurality of pixels P, an efficiency residual ratio indicating a degradation degree of pixel P, based on the cumulative stress and correlation data that corresponds to pixel P and indicates a relationship between the cumulative stress and the efficiency residual ratio; first corrector 112 that generates, for each of the plurality of pixels P, a first correction signal by correcting a luminance signal corresponding to pixel P, based on the efficiency residual ratio that corresponds to pixel P and is determined by efficiency residual ratio determiner 133; and second corrector 114 that generates a second correction signal by correcting the first correction signal, based on an additional gain signal input to the display device.

Accordingly, the same effects as those of the above-described driving method of a display device can be achieved.

Other Forms

Variations Etc. of Embodiments

Hereinbefore, a display device and a driving method for driving the display device according to the above aspects have been described based on exemplary embodiments, but the present disclosure is not limited to these embodiments. One or more aspects may include forms achieved by making various modifications to the above embodiments that can be conceived by those skilled in the art, as well as forms achieved by combining constituent elements in embodiments and variations, without materially departing from the spirit of the present disclosure.

For example, the circuit configuration of the plurality of pixels P is not limited to the example illustrated in FIG. 3. As the circuit configuration of the plurality of pixels P, other known circuit configurations may be applied.

In addition, in the above-described embodiments, although the video signal is an RGB signal, a signal other than the RGB signal may be included in the video signal. That is, it is sufficient for the video signal to include an RGB signal.

In addition, the video signal is not limited to a signal including an RGB signal. For example, the video signal may be a color difference signal including a luminance signal.

In addition, in the above-described embodiments, although the example has been illustrated in which the organic EL element is used as the self-luminous element, the self-luminous element is not limited to this. For example, a quantum dot, an inorganic EL element, or the like may be used as a self-luminous element.

In addition, one or more of the constituent elements included in the display device (the control circuit in particular) according to each of the embodiments described above may be a computer system including a microprocessor, ROM, random-access memory (RAM), and a hard disk unit, for example. A computer program is stored in the RAM or the hard disk unit. The function is achieved as a result of the microprocessor operating according to the computer program. Here, the computer program is configured by combining a plurality of instruction codes indicating instructions to the computer in order to fulfill a given function.

In addition, one or more of the constituent elements included in the display device according to each of the embodiments described above may be configured as a single system large scale integration (LSI) circuit. A system LSI is a super multifunctional LSI manufactured by integrating a plurality of elements on a single chip, and is specifically a computer system including, for example, a microprocessor, ROM, and RAM. A computer program is stored in the RAM. The system LSI circuit fulfills the functions as a result of the microprocessor operating according to the computer program.

In addition, one or more of the constituent elements included in the display device according to each of the embodiments described above may be configured as an integrated circuit (IC) card or standalone module attachable to and detachable from each device. The IC card or module is a computer system including, for example, a microprocessor, ROM, and RAM. The IC card or module may include the above-described super multifunctional LSI. The IC card or module fulfills the functions as a result of the microprocessor operating according to a computer program. The IC card or module may be tamperproof.

In addition, one or more of the constituent elements included in the display device according to each of the embodiments described above may be a computer-readable recording medium, such as a flexible disk, hard disk, CD-ROM, magneto-optical (MO) disc, digital versatile disc (DVD), DVD-ROM, DVD-RAM, Blu-ray Disc (BD; registered trademark), semiconductor memory, etc., having recording thereon the computer program or the digital signal. One or more of the constituent elements included in the display device according to each of the embodiments described above may be the digital signal recorded on the recording medium.

In addition, one or more of the constituent elements included in the display device according to each of the embodiments described above may transmit the computer program or the digital signal via, for example, a telecommunication line, a wireless or wired communication line, a network such as the Internet, or data broadcasting.

In addition, the present disclosure may be the methods described above. The present disclosure may be a computer program implementing these methods with a computer, or a digital signal of the computer program. In addition, the present disclosure may be implemented as a non-transitory computer-readable recoding medium, such as CD-ROM, having the computer program recorded thereon.

In addition, the present disclosure may be implemented as a computer system including (i) memory having the computer program stored therein, and (ii) a microprocessor that operates according to the computer program.

In addition, the present disclosure may be implemented by another independent computer system by recording the program or the digital signal on the recording medium and transporting it, or by transporting the program or the digital signal via the network, etc.

The above embodiments and above variations may be arbitrarily combined.

INDUSTRIAL APPLICABILITY

The driving method of the display device and the display device according to the present disclosure are useful in the technical field of displays for flat TVs, personal computers, and the like.

The invention claimed is:

1. A display device driving method of driving a display device that includes a display panel including a plurality of pixels, the display device driving method comprising:

calculating, for each of the plurality of pixels, cumulative stress that is an accumulation of stress corresponding to an output luminance of the pixel;

selecting, based on a selection signal input to the display device, one correlation data item from among a plurality of correlation data items each corresponding to a different one of the plurality of pixels and indicating a relationship between the cumulative stress and an efficiency residual ratio that indicates a degradation degree of the pixel;

determining the efficiency residual ratio, based on the one correlation data item and the cumulative stress; and correcting, for each of the plurality of pixels, a luminance signal corresponding to the pixel based on the efficiency residual ratio that corresponds to the pixel and is determined in the determining of the efficiency residual ratio.

2. The display device driving method according to claim 1, wherein for each of the plurality of pixels, a correspondence relationship between the pixel and the selection signal is determined based on a position signal input to the display device, and the selection signal is determined based on a change in the position signal.

3. The display device driving method according to claim 2, wherein the position signal corresponds to a position of a cursor displayed on the display panel.

4. The display device driving method according to claim 2, wherein the display panel is a touch panel, and the position signal corresponds to a touched position on the display panel.

5. A display device driving method of driving a display device that includes a display panel including a plurality of pixels, the display device driving method comprising:

calculating, for each of the plurality of pixels, cumulative stress that is an accumulation of stress corresponding to an output luminance of the pixel;

determining, for each of the plurality of pixels, an efficiency residual ratio indicating a degradation degree of the pixel, based on the cumulative stress and correlation data that corresponds to the pixel and indicates a relationship between the cumulative stress and the efficiency residual ratio;

generating, for each of the plurality of pixels, a first correction signal by correcting a luminance signal corresponding to the pixel based on the efficiency residual ratio that corresponds to the pixel and is determined in the determining of the efficiency residual ratio; and generating a second correction signal by correcting the first correction signal based on an additional gain signal input to the display device.

6. The display device driving method according to claim 5, wherein for each of the plurality of pixels, a correspondence relationship between the pixel and the additional gain signal is determined based on a position signal input to the display device, and the additional gain signal is determined based on a change in the position signal.

7. The display device driving method according to claim 6, wherein the position signal corresponds to a position of a cursor displayed on the display panel.

8. The display device driving method according to claim 6, wherein the display panel is a touch panel, and the position signal corresponds to a touched position on the display panel.

9. A display device that includes a display panel including a plurality of pixels, the display device comprising:

a cumulative stress calculator that calculates, for each of the plurality of pixels, cumulative stress that is an accumulation of stress corresponding to an output luminance of the pixel;

a selector that selects, based on a selection signal input to the display device, one correlation data item from among a plurality of correlation data items each corresponding to a different one of the plurality of pixels and indicating a relationship between the cumulative stress and an efficiency residual ratio that indicates a degradation degree of the pixel;

an efficiency residual ratio determiner that determines the efficiency residual ratio, based on the one correlation data item and the cumulative stress; and a corrector that corrects, for each of the plurality of pixels, a luminance signal corresponding to the pixel based on the efficiency residual ratio that corresponds to the pixel and is determined by the efficiency residual ratio determiner.

10. A display device that includes a display panel including a plurality of pixels, the display device comprising:

a cumulative stress calculator that calculates, for each of the plurality of pixels, cumulative stress that is an accumulation of stress corresponding to an output luminance of the pixel;

an efficiency residual ratio determiner that determines, for each of the plurality of pixels, an efficiency residual ratio indicating a degradation degree of the pixel, based on the cumulative stress and correlation data that corresponds to the pixel and indicates a relationship between the cumulative stress and the efficiency residual ratio;

a first corrector that generates, for each of the plurality of pixels, a first correction signal by correcting a luminance signal corresponding to the pixel based on the efficiency residual ratio that corresponds to the pixel and is determined by the efficiency residual ratio determiner; and a second corrector that generates a second correction signal by correcting the first correction signal based on an additional gain signal input to the display device.

* * * * *